Figure 1:
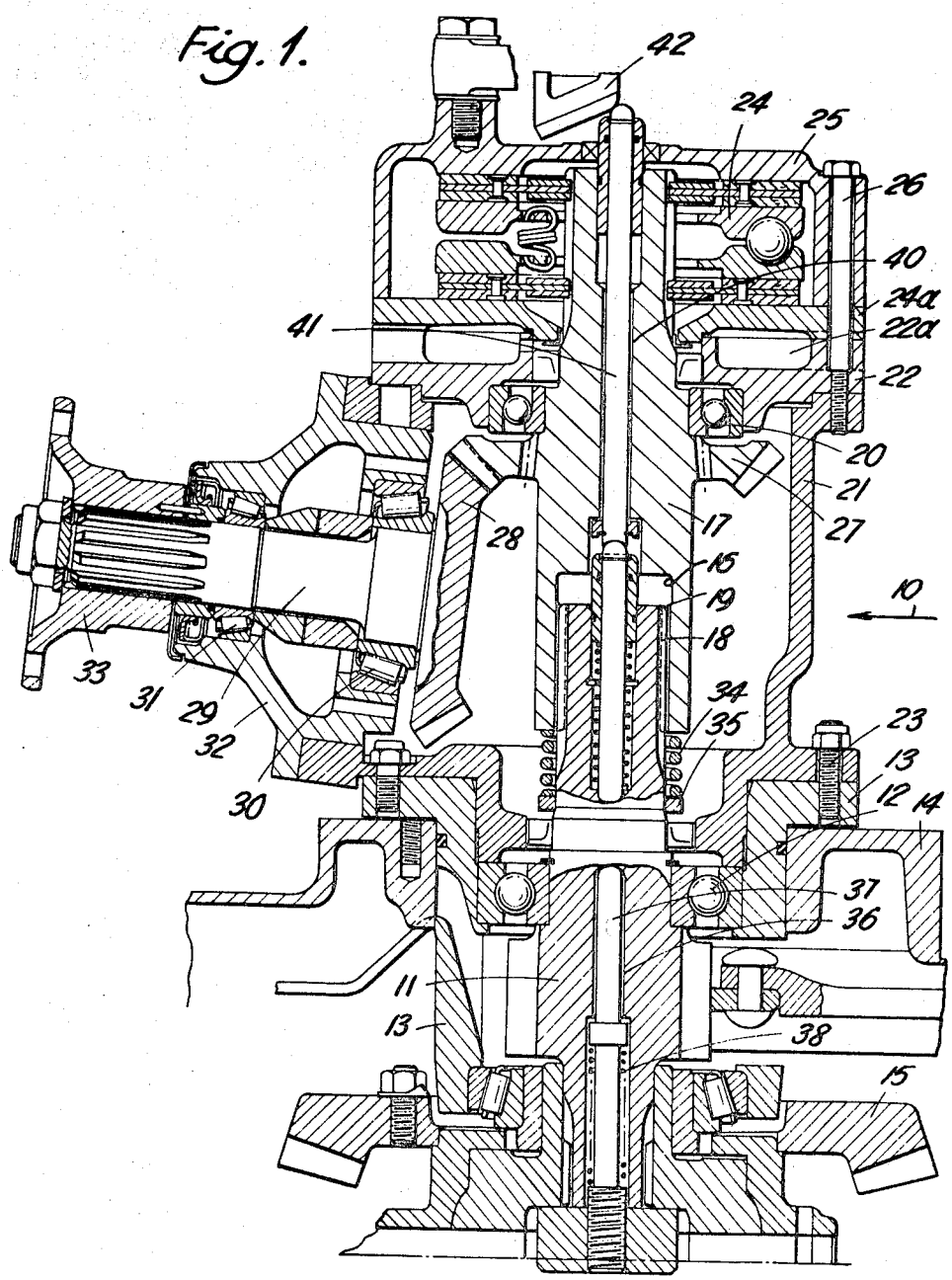

United States Patent

[11] 3,550,711

| [72] | Inventors | Geoffrey Edward Ernest Tapp<br>Farnham;<br>Joseph Davey, Crookham, England |
|---|---|---|
| [21] | Appl. No. | 757,025 |
| [22] | Filed | Sept. 3, 1968 |
| [45] | Patented | Dec. 29, 1970 |
| [73] | Assignee | County Commercial Cars Limited<br>Aldershot, England<br>a British company |
| [32] | Priority | Sept. 4, 1967 |
| [33] | | Great Britain |
| [31] | | No. 40,388/67 |

[54] FOUR WHEEL DRIVE VEHICLE
3 Claims, 2 Drawing Figs.

[52] U.S. Cl. ........................................................ 180/44,
74/710.5; 180/75
[51] Int. Cl. ........................................................ B60k 17/34
[50] Field of Search ........................................... 180/44, 49,
75; 74/710.5

[56] References Cited
UNITED STATES PATENTS

| 1,648,076 | 11/1927 | Stripling ...................... | 180/75 |
| 3,054,468 | 9/1962 | Tapp et al. .................... | 180/44 |
| 3,145,798 | 8/1964 | Tapp et al. .................... | 180/44 |

FOREIGN PATENTS

| 824,299 | 11/1959 | Great Britain ............... | 180/49 |

*Primary Examiner*—A. Harry Levy
*Attorney*—Young & Thompson

ABSTRACT: A four wheel vehicle normally driven through one pair of wheels only is adapted for drive through all four wheels by taking the drive from the shafts driving the two wheels through two transmission shafts extending between the two pairs of wheels, and each driving one of the normally undriven wheels. The drive is transmitted from each of the rear drive shafts by means of an extension shaft, connected to the drive shaft, and having gearing to turn the drive through a right angle to drive each transmission shaft. The end of the extension shaft is formed so that any braking means normally attached to the rear drive shafts may be attached to the extension shaft.

INVENTORS
GEOFFREY EDWARD ERNEST TAPP
JOSEPH DAVEY
By Young + Thompson
ATTYS.

FOUR WHEEL DRIVE VEHICLE

The invention relates to driving transmissions for motor vehicles of the kind having four wheels and in which a transmission driving a pair of wheels at one end of the vehicle includes an output shaft having a transmission braking assembly associated therewith.

Such a vehicle is particularly suitable for conversion to four-wheel drive. In the case where two of said output shafts are provided the conversion can be effected by arranging for a drive from each output shaft to be transmitted to one of the wheels at the other end of the vehicle by means of a transmission shaft extending longitudinally of the vehicle. Hitherto such a conversion has been effected by replacing the existing output shaft, transmission braking assembly, and its associated support structure, by a complete new assembly which embodies a longer output shaft and which includes means for drivably connecting the longer output shaft to the aforementioned longitudinal transmission shaft. It is an object of the invention to facilitate conversion to four-wheel drive by making use of existing components on the vehicle.

According to the invention, in a vehicle of the kind first referred to, there is drivably coupled to said output shaft an extension shaft having associated therewith means for transmitting a drive from the extension shaft to a transmission shaft which extends longitudinally of the vehicle and transmits a drive to a wheel at the other end of the vehicle.

The extension shaft may be coaxial with the output shaft and connected to one end thereof. For example the extension shaft may comprise at one end thereof a socket into which the end of the output shaft projects and is drivably connected. In the case where the end of the output shaft is formed with splines these may enter into engagement with corresponding splines on the extension shaft.

In the case where the aforementioned transmission braking assembly is adapted normally to be coupled to the end of the output shaft, the braking assembly may be coupled to the end of the extension shaft remote from the output shaft, that end of the extension shaft being similarly formed to the end of the output shaft so that the braking assembly may be readily coupled to it.

In the case where a fixed part of the braking assembly is adapted normally to be mounted on a fixed part of the vehicle adjacent the output shaft, the extension shaft is preferably supported on a fixed extension structure which is interposed between the fixed part of the braking assembly and the fixed part of the vehicle.

The extension structure may have rotatably mounted thereon a gear wheel driving the aforementioned longitudinal transmission shaft, which gear wheel is driven by a further gear wheel carried by the extension shaft. The two gear wheels may be bevel gear wheels.

In the case where a reciprocable operating shaft, for example for operating a differential lock, extends along an axial bore within the output shaft, the extension shaft may also be provided with an axial bore within which is reciprocable an extension operating shaft secured, or engageable with, the end of the first said operating shaft.

Figure 2:
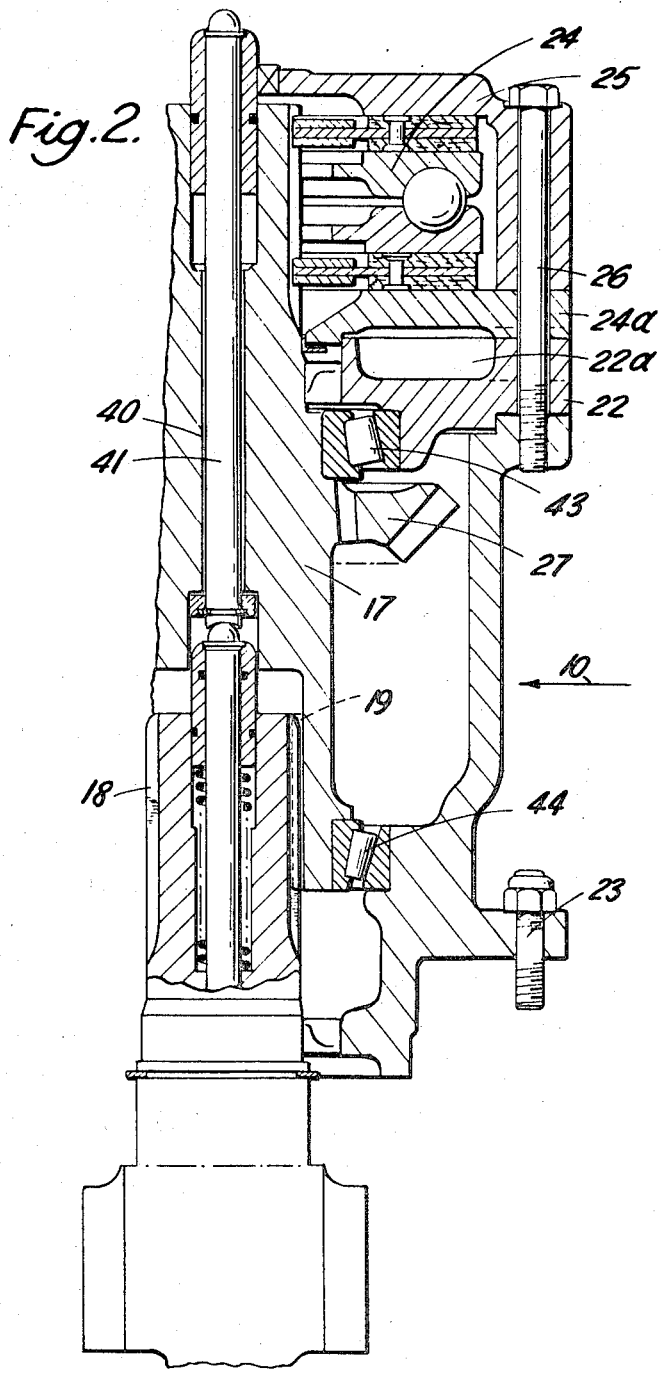

The following is a more detailed description of one embodiment of the invention, reference being made to the accompanying drawings in which:

FIG. 1 is a horizontal section through part of the transmission of a four-wheel drive conversion of a tractor; and FIG. 2 is a similar section through part of a slightly modified arrangement.

The general arrangement of the tractor and of the transmission of a drive to the four wheels of the tractor is generally similar to that shown in British Patent No. 881,346 and will not be described in detail. In FIG. 1 the normal forward direction of travel of the tractor is indicated by the arrow 10.

An output shaft 11 is rotatably mounted in a bearing 12 in a fixed part 13 secured to the vehicle chassis 14.

The shaft 11 is the offside output shaft from a differential, the crown wheel driving the differential being indicated at 15. The offside and nearside output shafts from the differential, as will be seen from said British Patent No. 881,346 have mounted thereon gear wheels which are in mesh with further gear wheels on two half shafts respectively which carry the rear wheels of the tractor. It will thus be appreciated that the arrangement shown in the drawing of the present specification will be repeated on the nearside of the vehicle.

The end of the shaft 11 which projects from the chassis 14 extends into a socket 16 in the end of an extension shaft 17. The end of the shaft 11 is formed with splines 18 which interengage with corresponding splines 19 within the sockets 16.

The shaft 17 is rotatably mounted by means of a bearing 20 on a support structure comprising a hollow casing 21 and an end plate 22. The casing 21 is secured by studs 23 to the fixed part 13. The bearing 20 is also a thrust bearing and a helical compression spring 34 encircles the shaft 11 between the end of the shaft 17 and an abutment ring 35 on the shaft 11 and urges the shaft outwards.

The end of the shaft 17 remote from the shaft 11 is similarly shaped to the end of the shaft 11 and has mounted on it a transmission brake assembly 24 carried within a fixed casing 25 which is secured by bolts 26 to the end plate 22 and casing 21.

The braking assembly 24 includes a plate 24a which forms one of the fixed surfaces against which the moving brake disc acts. In conventional arrangements the plate would be integrally formed with an equivalent of the end plate 22. However, due to the heat generated by the braking action, such an arrangement can and does cause trouble with the seal mounted in the bore of the plate 22 and even the bearing 20 mounted also on the same plate, both becoming damaged by the heat. The seal is more susceptible to heat and when it fails oil is allowed to pass into the brake chamber, rendering the brakes useless. In the arrangement shown, part of the plate 22 which contacts the plate 24a with the brake surface is partially hollow, as indicated at 22a, so that the two plates register only on their outer extremities and a small register close to the bore. In this way to a large extent the heat of braking is insulated from the seal and the bearing.

Roughly halfway along its length the shaft 17 is integrally formed with a bevel gear 27 which is in mesh with a bevel gear 28 mounted on the end of a stub shaft 29. The stub shaft 29 is rotatable in bearings 30 and 31 in a housing 32 which is mounted in the wall of the casing 21. Splined to the end of the stub shaft 29 is a part 33 of a coupling which is connected via a universal joint (not shown) to the rear end of a transmission shaft which extends longitudinally of the vehicle and is coupled at its forward end, by a suitable transmission, to the front offside wheel of the vehicle. It will thus be seen that with the arrangement shown the shaft 11 as well as driving the offside rear wheel of the vehicle through the aforementioned gear wheels also transmits a drive to the front offside wheel of the vehicle via the extension shaft 17, gear wheels 27 and 28, stub shaft 29, and longitudinally extending transmission shaft.

The shaft 11 is formed with an axially extending bore 36 through which passes an operating rod 37 which is urged outwardly by a helical compression spring 38 encircling the rod 37 within enlargements of the bore 36. The purpose of the rod 37 is to operate a differential lock when moved longitudinally. The extension shaft 17 is also formed with an axial bore 40 in which is disposed an extension operating shaft 41 which engages the end of the shaft 37 and which projects from the end of the transmission braking assembly 24 so that the rods 41 and 37 may be reciprocated by a manually controlled member 42 to operate the differential lock.

Before conversion of the tractor to four-wheel drive, the casing 25 of the transmission braking assembly is normally bolted directly to the fixed part 13 on the vehicle chassis and the moving parts of the braking assembly are coupled directly to the splined end of the shaft 11, the operating rod 37 then projecting from the casing of the transmission braking assembly. When it is required to convert the tractor to a four-wheel drive the braking assembly as a whole is removed and the unit comprising the casing 21, plate 22, extension shaft 17, housing 32 and stub shaft 29 is bolted to the vehicle chassis by the studs 23, the socket 16 in the extension shaft 17 being fitted over the splined end of the shaft 11. The braking assembly 24, 25 is then bolted by the bolts 26 to the end of the unit, the moving parts of the braking assembly being coupled onto the splined end of the extension shaft 17.

In the alternative arrangement shown in FIG. 2 the thrust ball bearing 20 and spring 34 are replaced by two opposed taper roller bearings 43 and 44. One roller bearing 43 replaces the bearing 20 and the other 44 is disposed between the socket end of the shaft 17 and the wall of the casing 21.

It will thus be seen that use is made of existing parts of the transmission. As mentioned earlier it was hitherto the practice, when effecting such a conversion, to remove the shaft 11 and to replace it by a longer shaft provided with the bevel gear for transmitting a drive to the longitudinally extending transmission shaft.

We claim:

1. A driving transmission, for motor vehicles of the kind having four wheels, a transmission driving a pair of the wheels at one end of the vehicle, an output shaft forming a part of the transmission, a braking assembly associated therewith for braking the transmission, and a reciprocable operating shaft extending along an axial bore within the output shaft for operating a mechanism within the transmission, comprising:
   a. an extension shaft for drivable connection to the output shaft;
   b. a transmission shaft for transmitting a drive to a wheel at the other end of the vehicle;
   c. drive transmitting means drivable connecting the extension shaft to the transmission shaft; and
   d. an axial bore in the extension shaft within which is reciprocable an extension operating shaft one end of which engages the end of said reciprocable operating shaft in said output shaft.

2. A motor vehicle of the kind having four wheels, a transmission driving a pair of the wheels at one end of the vehicle, an output shaft driven by said transmission, and a transmission braking assembly driven by said output shaft, comprising:
   a. an extension shaft drivably connected between the output shaft and the braking assembly;
   b. a transmission shaft extending longitudinally of the vehicle;
   c. which transmission shaft transmits a drive to a wheel at the other end of the vehicle;
   d. means transmitting a drive from the extension shaft to the transmission shaft;
   e. an axial bore extending along the output shaft; and
   f. a reciprocable operating shaft extending along the axial bore for operating a mechanism within the transmission.

3. A motor vehicle according to claim 2 and further comprising an axial bore within the extension shaft within which is reciprocable an extension operating shaft one end of which engages the end of said reciprocable operating shaft in said output shaft.